(12) United States Patent
Yanase et al.

(10) Patent No.: US 9,969,018 B2
(45) Date of Patent: May 15, 2018

(54) INTERNAL GEAR MACHINING METHOD AND INTERNAL GEAR MACHINING DEVICE

(75) Inventors: Yoshikoto Yanase, Tokyo (JP); Masashi Ochi, Tokyo (JP)

(73) Assignee: MITSUBISHI HEAVY INDUSTRIES MACHINE TOOL CO., LTD., Ritto-Shi, Shiga (JP)

( * ) Notice: Subject to any disclaimer, the term of this patent is extended or adjusted under 35 U.S.C. 154(b) by 1272 days.

(21) Appl. No.: 13/389,413

(22) PCT Filed: Aug. 6, 2010

(86) PCT No.: PCT/JP2010/063351
§ 371 (c)(1),
(2), (4) Date: Apr. 3, 2012

(87) PCT Pub. No.: WO2011/024626
PCT Pub. Date: Mar. 3, 2011

(65) Prior Publication Data
US 2012/0184183 A1    Jul. 19, 2012

(30) Foreign Application Priority Data

Aug. 24, 2009   (JP) ................................ 2009-192770

(51) Int. Cl.
*B23F 5/04*    (2006.01)
*B23F 15/00*   (2006.01)
(Continued)

(52) U.S. Cl.
CPC ........ *B23F 23/1218* (2013.01); *G05B 19/186* (2013.01); *G05B 2219/45214* (2013.01)

(58) Field of Classification Search
CPC .............. B23F 23/1218; B23F 23/1225; B23F 23/1231; G05B 19/186; G05B 2219/45214
(Continued)

(56) References Cited

U.S. PATENT DOCUMENTS 1,797,461 A * 3/1931 Wildhaber ...................... 409/12
1,955,082 A * 4/1934 Miller ........................... 451/219
(Continued)

FOREIGN PATENT DOCUMENTS

EP      2 196 275 A1    6/2010
JP      2003-236720 A   8/2003
(Continued)

OTHER PUBLICATIONS

Hoyashita, Shigeru, "Barrel Worm-Shaped Tool with Conjugate Cutting-Edge Profile Generated from Tooth Profile of Internal Gear," Journal of the Japan Society of Mechanical Engineers (Series C), vol. 62, No. 593, Jan. 1996, pp. 284-290.*
(Continued)

*Primary Examiner* — Christopher M Koehler
*Assistant Examiner* — Joel Crandall
(74) *Attorney, Agent, or Firm* — Birch, Stewart, Kolasch & Birch, LLP

(57) ABSTRACT

An internal gear machining method and an internal gear machining device, are provided for grinding of a tooth profile of an internal gear using a barrel-shaped threaded grinding wheel. An NC device functions as a tooth profile error correction means and reduces a measured pressure angle error of a workpiece at a tooth face by correcting the radial position, the lateral position of the grinding wheel, the turning angle of the grinding wheel, and the helical motion; reduces a measured error in the direction of a tooth trace of the workpiece at a tooth face by correcting the helical (Continued)

motion; and reduces a measured tooth thickness error of the workpiece at a tooth face by correcting the radial position, the lateral position of the grinding wheel, and the helical motion.

14 Claims, 8 Drawing Sheets

(51) Int. Cl.
  *B23F 23/12* (2006.01)
  *G05B 19/18* (2006.01)
(58) Field of Classification Search
  USPC .................................................... 451/27, 47
  See application file for complete search history.

(56) References Cited

U.S. PATENT DOCUMENTS

| | | | |
|---|---|---|---|
| 1,956,407 A * | 4/1934 | Wildhaber | 451/47 |
| 2,027,621 A * | 1/1936 | Schicht | 451/137 |
| 2,228,965 A * | 1/1941 | Miller | 407/27 |
| 2,228,967 A * | 1/1941 | Miller | 76/115 |
| 4,561,216 A * | 12/1985 | Miyatake et al. | 451/26 |
| 4,689,918 A * | 9/1987 | Loos et al. | 451/253 |
| 4,693,231 A * | 9/1987 | Buschmeier | 125/11.03 |
| 4,811,528 A * | 3/1989 | Sommer | 451/5 |
| 5,289,815 A * | 3/1994 | Krenzer | 125/11.03 |
| 5,539,172 A * | 7/1996 | Takase et al. | 219/69.2 |
| 5,720,584 A * | 2/1998 | Sijtstra | B23F 15/06 407/20 |
| 6,146,253 A * | 11/2000 | Litvin et al. | 451/47 |
| 6,217,409 B1 * | 4/2001 | Stadtfeld et al. | 451/5 |
| 6,247,376 B1 * | 6/2001 | Zhou | B21H 5/005 29/893.31 |
| 6,491,568 B1 * | 12/2002 | Jankowski | B24B 53/075 451/253 |
| 2002/0119737 A1 * | 8/2002 | Tan | 451/47 |
| 2005/0239385 A1 * | 10/2005 | Jankowski et al. | 451/540 |
| 2006/0014474 A1 * | 1/2006 | Yanase et al. | 451/5 |
| 2006/0025050 A1 | 2/2006 | Yanase et al. | |
| 2008/0268750 A1 * | 10/2008 | Fisher et al. | 451/5 |
| 2009/0028655 A1 * | 1/2009 | Ribbeck et al. | 409/27 |
| 2010/0023297 A1 * | 1/2010 | Kikuchi et al. | 702/150 |

FOREIGN PATENT DOCUMENTS

| | | |
|---|---|---|
| JP | 2006-035400 A | 2/2006 |
| JP | 3986320 B2 | 10/2007 |
| JP | 2009-142939 A | 7/2009 |
| KP | 10-2010-0036346 A | 4/2010 |

OTHER PUBLICATIONS

Korean Notice of Allowance dated Jan. 28, 2014 for corresponding Korean Application No. 10-2012-7004739 and an English translation.

* cited by examiner

Fig. 7

RELATIONSHIPS BETWEEN TOOTH PROFILE ERRORS OF INTERNAL GEAR AND AXIS CORRECTION ITEMS

| | | TOOTH PROFILE ERROR OF INTERNAL GEAR | | |
|---|---|---|---|---|
| | | PRESSURE ANGLE ERROR ($\Delta fa_L, \Delta fa_R$) | TOOTH TRACE ERROR ($\Delta L$) | TOOTH THICKNESS ERROR ($\Delta th$) |
| AXIS CORRECTION ITEM | RADIAL POSITION ERROR ($\Delta X$) | ◯ | | ◯ |
| | GRINDING WHEEL LATERAL POSITION ERROR ($\Delta Y$) | ◯ | | |
| | GRINDING WHEEL TURNING ANGLE ERROR ($\Delta \Sigma$) | ◯ | | ◯ |
| | HELICAL MOTION ERROR ($\Delta P$) | | ◯ | ◯ |

◯ : AXIS CORRECTION ITEM AFFECTING TOOTH PROFILE ERROR OF INTERNAL GEAR

INTERNAL GEAR MACHINING METHOD AND INTERNAL GEAR MACHINING DEVICE

TECHNICAL FIELD

The present invention relates to an internal gear machining method and an internal gear machining apparatus for performing grinding (tooth profile grinding) of tooth surfaces of an internal gear with a barrel-shaped threaded grinding wheel.

BACKGROUND ART

In general, a gear cutting process includes: forming a gear by cutting a predetermined gear material; heat-treating the machined gear; and then finishing (tooth profile grinding) the gear to remove distortion and the like due to this heat treatment. Heretofore, various tooth profile grinding methods using tools such as WA grinding wheels and superabrasive (diamond, CBN, and the like) grinding wheels have been provided to efficiently finish the tooth surfaces of a gear after heat treatment. Moreover, the forms of tools used in these methods are external gear forms, internal gear forms, screw (worm) forms, and the like which are chosen in accordance with the form of a gear to be ground.

On the other hand, among gears, internal gears are frequently used in automotive transmissions and the like. Recently, there has been a demand for the improvement in the machining accuracy of the gears for the purpose of reducing the vibration and noise of the transmissions.

In this regard, as one of the methods of grinding an internal gear after heat treatment, an internal gear machining method is provided in which grinding of tooth surfaces of an internal gear is performed using a barrel-shaped threaded grinding wheel by synchronously rotating the internal gear and the barrel-shaped threaded grinding wheel in mesh with each other with a crossed-axes angle formed therebetween. In this internal gear machining method, the meshing rotation and the crossed-axes angle of the internal gear and the barrel-shaped threaded grinding wheel generate a slip velocity (grinding velocity) between the internal gear and the barrel-shaped threaded grinding wheel, and this allows the tooth surfaces of the internal gear to be ground by the barrel-shaped threaded grinding wheel.

PRIOR ART DOCUMENT

Patent Document

PATENT DOCUMENT 1: Japanese Patent No. 3986320

SUMMARY OF THE INVENTION

Problem to be Solved by the Invention

When tooth surfaces of an external gear are ground with a cylindrical threaded grinding wheel, the tooth profile of the workpiece (external gear) does not change (however, the tooth thickness thereof changes) even if the relative position between the threaded grinding wheel and the workpiece changes. Meanwhile, as described in Patent Document 1, in the case of using a form grinding wheel (grinding wheel) for profile grinding of the external gear, the tooth profile of the workpiece changes when the relative position between the grinding wheel and the workpiece (external wheel) changes. In other words, tooth profile errors (pressure angle errors, a tooth trace error, and a tooth thickness error) occur in the workpiece. To counter this, Patent Document 1 proposes a method of performing highly accurate tooth profile grinding of an external gear by correcting the tooth profile errors.

In the case of generating grinding of an internal gear with a threaded grinding wheel, the threaded grinding wheel preferably has a barrel shape whose diameter gradually increases toward the axial center portion thereof from both of axial end portions thereof, in order to prevent the interference between the threaded grinding wheel and the internal gear. The inventors of the present application have conducted simulations (numerical calculation) and experiments on the tooth profile grinding of an internal gear with a barrel-shaped threaded grinding wheel, and found out the following facts. In the case where the internal gear is ground with the barrel-shape threaded grinding wheel, unlike the case where an external gear is ground with a cylindrical threaded grinding wheel, the tooth profile of the workpiece (internal gear) changes when the relative position between the barrel-shaped threaded grinding wheel and the workpiece (internal gear) changes. In other words, the tooth profile errors (the pressure angle errors, the tooth trace error, and the tooth thickness error) occur in the workpiece (internal gear).

The present invention has been made in view of the above circumstance, and an object of the present invention is to provide an internal gear machining method and an internal gear machining apparatus which achieves highly accurate tooth profile grinding by correcting a relative position between a barrel-shaped threaded grinding wheel and a workpiece (internal gear) and thus reducing tooth profile errors of the workpiece when tooth profile grinding of the internal gear is performed using the barrel-shaped threaded grinding wheel.

Means for Solving the Problem

As described above, by performing simulations and experiments on the tooth profile grinding of an internal gear using a barrel-shaped threaded grinding wheel, the inventors of the present application have obtained a new finding that the tooth profile errors (the pressure angle errors, the tooth trace error, and the tooth thickness error) occur in the internal gear when the relative position between the barrel-shaped threaded grinding wheel and the internal gear changes. In addition, through the simulations, the inventors of the present invention have made clear the relationship between the tooth profile errors (the pressure angle errors, the tooth trace error, and the tooth thickness error) and axis correction items (see FIG. 7). The internal gear machining method and the internal gear machining apparatus of the present invention are based on these new findings, and have the following characteristics.

Specifically, an internal gear machining method of a first invention for solving the above-described problem is an internal gear machining method in which grinding of a tooth surface of an internal gear is performed using a barrel-shaped threaded grinding wheel by synchronously rotating the internal gear and the barrel-shaped threaded grinding wheel in mesh with each other with a crossed-axes angle formed between the internal gear and the barrel-shaped threaded grinding wheel, the internal gear machining method characterized in that the method comprises:

reducing measured pressure angle errors in the tooth surface of the internal gear by correcting a radial position, a grinding wheel lateral position, a grinding wheel turning angle, and a helical motion;

reducing a measured tooth trace error in the tooth
surface of the internal gear by correcting the helical
motion; and reducing a measured tooth thickness error in the tooth
surface of the internal gear by correcting the radial
position, the grinding wheel lateral position, and the
helical motion.

An internal gear machining method of a second invention is characterized in that, in the internal gear machining method of the first invention, first, a correction amount for the helical motion is set that causes the tooth trace error to be reduced, next, a correction amount for a grinding wheel lateral position is set that causes the pressure angle errors being asymmetric to be reduced, then, a correction amount for the radial position error and a correction amount for the grinding wheel turning angle are set that cause the pressure angle errors being symmetric and the tooth thickness error to be reduced, and the radial position, the grinding wheel lateral position, the grinding wheel turning angle, and the helical motion are corrected based on the correction amounts.

An internal gear machining method of a third invention is characterized in that, in the internal gear machining method of the first or second invention, analyses are made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error, based on results of the analyses, the correction amounts for the radial position, the grinding wheel lateral position, the helical motion, and the grinding wheel turning angle are set that cause the pressure angle errors, the tooth trace error, and the tooth thickness error to be reduced, and the radial position, the grinding wheel lateral position, the helical motion, and the grinding wheel turning angle are corrected based on the correction amounts.

An internal gear machining method of a fourth invention is characterized in that, in the internal gear machining method of any of the first to third inventions, if the internal gear is a spur gear, the correction amount for the helical motion is set to zero.

An internal gear machining apparatus of a fifth invention is an internal gear machining apparatus in which grinding of a tooth surface of an internal gear is performed using a barrel-shaped threaded grinding wheel by synchronously rotating the internal gear and the barrel-shaped threaded grinding wheel in mesh with each other with a crossed-axes angle formed between the internal gear and the barrel-shaped threaded grinding wheel, the internal gear machining apparatus characterized in that the apparatus comprises tooth profile error correction means for:

reducing measured pressure angle errors in the tooth surface of the internal gear by correcting a radial position, a grinding wheel lateral position, a grinding wheel turning angle, and a helical motion;

reducing a measured tooth trace error in the tooth surface of the internal gear by correcting the helical motion; and reducing a measured tooth thickness error in the tooth surface of the internal gear by correcting the radial position, the grinding wheel lateral position, and the helical motion.

An internal gear machining apparatus of a sixth invention is characterized in that, in the internal gear machining apparatus of the fifth invention, the tooth profile error correction means first, sets a correction amount for the helical motion that causes the tooth trace error to be reduced;

next, sets a correction amount for a grinding wheel lateral position that causes the pressure angle errors being asymmetric to be reduced;

then, sets a correction amount for the radial position error and a correction amount for the grinding wheel turning angle that cause the pressure angle errors being symmetric and the tooth thickness error to be reduced; and corrects the radial position, the grinding wheel lateral position, the grinding wheel turning angle, and the helical motion on the basis of the correction amounts.

An internal gear machining apparatus of a seventh invention is characterized in that, in the internal gear machining apparatus of the fifth or sixth invention, the tooth profile error correction means sets the correction amounts for the radial position, the grinding wheel lateral position, the helical motion, and the grinding wheel turning angle that cause the pressure angle errors, the tooth trace error, and the tooth thickness error to be reduced, on the basis of analyses made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error, and the tooth profile error correction means corrects the radial position, the grinding wheel lateral position, the helical motion, and the grinding wheel turning angle on the basis of the correction amounts.

An internal gear machining apparatus of an eighth invention is characterized in that, in the internal gear machining apparatus of the fifth to seventh inventions, if the internal gear is a spur gear, the tooth profile error correction means sets the correction amount for the helical motion to zero.

Effects of the Invention

According to the internal gear machining method of the first invention and the internal gear machining apparatus of the fifth invention, pressure angle errors in a tooth surface of an internal gear are reduced by correcting a radial position, a grinding wheel lateral position, a grinding wheel turning angle, and a helical motion; a tooth trace error in the tooth surface of the internal gear is reduced by correcting the helical motion; and a tooth thickness error in the tooth surface of the internal gear is reduced by correcting the radial position, the grinding wheel lateral position, and the helical motion. Thus, even if the tooth profile errors (the pressure angle errors, the tooth trace error, and the tooth thickness error) occur in the tooth profile grinding of the internal gear using the barrel-shaped threaded grinding wheel, correction is made using the axis correction items (a radial position error, a grinding wheel lateral position error, a grinding wheel turning angle error, and a helical motion error) appropriate for the tooth profile errors. Hence, the tooth profile errors can be surely corrected (reduced).

According to the internal gear machining method of the second invention and the internal gear machining apparatus of the sixth invention, first, a correction amount for the helical motion is set that causes the tooth trace error to be reduced; next, a correction amount for a grinding wheel lateral position is set that causes the pressure angle errors being asymmetric to be reduced; then, a correction amount for the radial position error and a correction amount for the grinding wheel turning angle are set that cause the pressure angle errors being symmetric and the tooth thickness error to be reduced; and the radial position, the grinding wheel lateral position, the grinding wheel turning angle, and the helical motion are corrected based on the correction amounts. Thus, the correction amounts (the correction amount for a radial position error, the correction amount for a grinding wheel lateral position error, the correction amount for a grinding wheel turning angle error, and the correction amount for a helical motion error) corresponding to the tooth profile errors (the asymmetric pressure angle errors, the symmetric pressure angle errors, the tooth trace error, and the tooth thickness error) can be sequentially set to perform correction.

According to the internal gear machining method of the third invention and the internal gear machining apparatus of the seventh invention, analyses are made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error; based on results of the analyses, the correction amounts for the radial position, the grinding wheel lateral position, the helical motion, and the grinding wheel turning angle are set that cause the pressure angle errors, the tooth trace error, and the tooth thickness error to be reduced; and the radial position, the grinding wheel lateral position, the helical motion, and the grinding wheel turning angle are corrected based on the correction amounts. Thus, the correction amounts for the radial position, the grinding wheel lateral position, the grinding wheel turning angle, and the helical motion (the radial position error, the grinding wheel lateral position error, the grinding wheel turning angle error, and the helical motion error) are found in consideration of influences of the pressure angle errors, the tooth trace error, and the tooth thickness error of the internal gear on each other. Hence, a highly accurate correction of the tooth profile errors of the internal gear can be performed in an early stage, thereby improving workability.

According to the internal gear machining method of the fourth invention and the internal gear machining apparatus of the eighth invention, if the internal gear is a spur gear, the correction amount for the helical motion is set to zero. Thus, this configuration is suitable for a case of a spur gear.

BRIEF DESCRIPTION OF THE DRAWINGS

FIG. 7 is a table showing a relationship between tooth profile errors of the internal gear and axis correction items.

MODE FOR CARRYING OUT THE INVENTION

An Embodiment of the present invention will be described below in detail based on the drawings.

Figure 1:
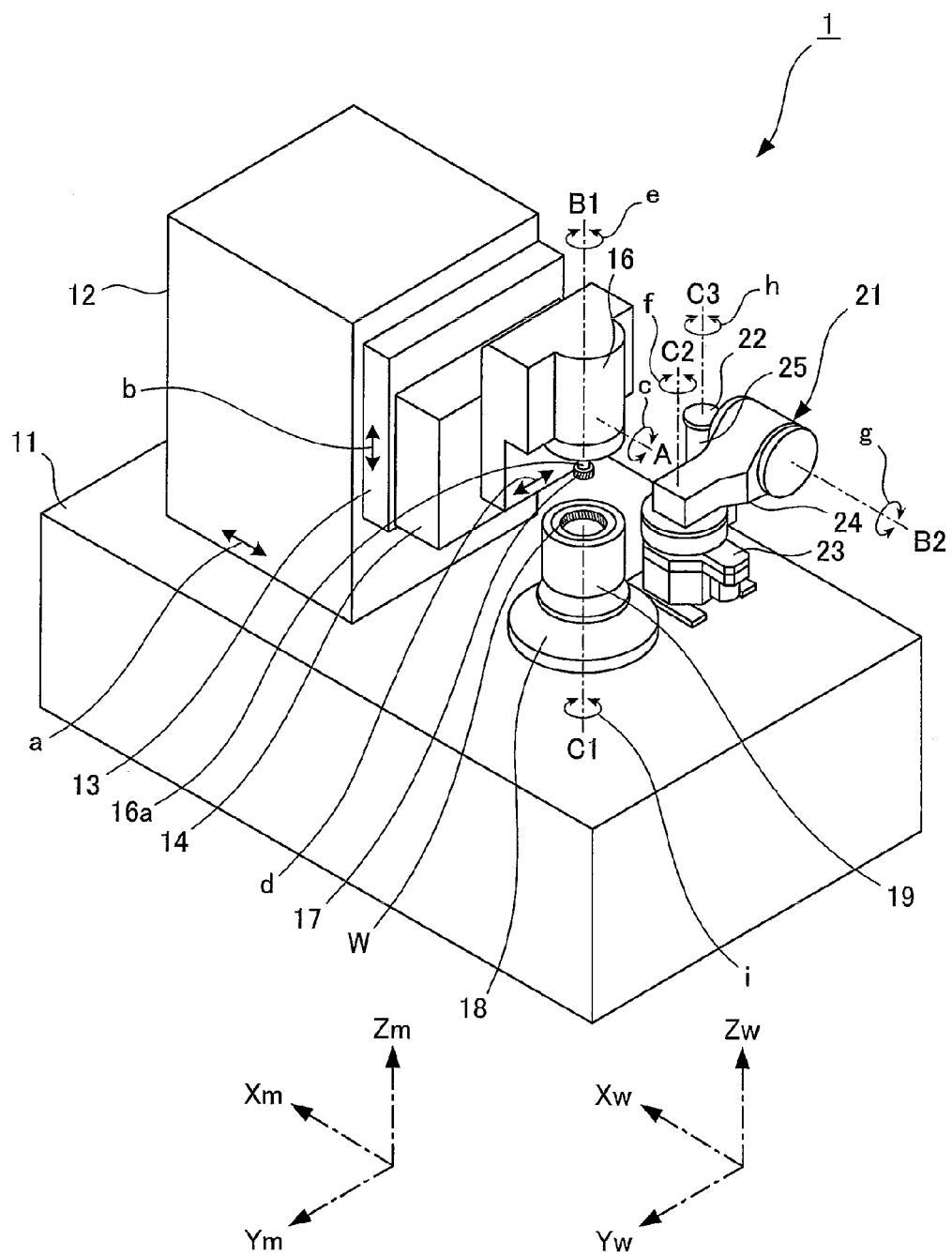
FIG. 1 is a perspective view showing a configuration of an internal gear grinding machine of an embodiment of the present invention.

In FIG. 1, an Xw axis, an Yw axis, and a Zw axis are reference axes of an orthogonal coordinate system (reference coordinate system) based on a workpiece W (fixed to the workpiece W). Moreover, an Xm axis, an Ym axis, and a Zm axis are movement axes of an internal gear grinding machine (internal gear machining apparatus) 1. The Xw axis and the Xm axis are horizontal movement axes extending in the same direction. The Zw axis and the Zm axis are vertical axes extending in the same direction. In the illustrated example, the Yw axis is a horizontal movement axis, while the Ym axis is a movement axis which may not only be in a horizontal state to extend in the same direction as the Yw axis, but may be in an inclined state by being turned, as will be described in detail later. Note that, the present invention is not limited to this configuration, and can be applied to the case where the Ym axis is not inclined and is a horizontal movement axis always extending in the same direction as the Yw axis.

As shown in FIG. 1, a column 12 is supported on a bed 11 of the internal gear grinding machine 1 to be moveable in the Xm axis (Xw axis) direction. The Xm axis (Xw axis) direction is a direction in which a grinding wheel rotation axis B1 is moved to adjust the distance between the grinding wheel rotation axis B1 and a workpiece rotation axis C1. On the column 12, a saddle 13 is supported to be moveable up and down in the Zm axis (Zw axis) direction. On the saddle 13, a turning head 14 is supported to be turnable about a horizontal grinding wheel turning axis A parallel to the Xm axis (Xw axis). On the turning head 14, a grinding wheel head 16 is supported to be moveable in the Ym axis direction orthogonal to the grinding wheel rotation axis B1. When the turning head 14 is not turned (when the grinding wheel rotation axis B1 extends in the Zm axis direction), the Ym axis direction coincides with the Yw axis direction of the reference axes. Meanwhile, when the turning head 14 is turned to turn the grinding wheel rotation axis B1 about the grinding wheel turning axis A and the grinding wheel rotation axis B1 is thus inclined with respect to the Zm axis (Zw axis) direction, the Ym axis direction is inclined with respect to the Yw axis direction of the reference axes.

An unillustrated grinding wheel main spindle and a grinding wheel arbor 16a attached to the grinding wheel main spindle are supported by the grinding wheel head 16 to be rotatable about the grinding wheel rotation axis B1. A threaded grinding wheel 17 is detachably attached to the front end of the grinding wheel arbor 16a.

In the internal gear grinding machine 1 with the above-described axis configuration, moving the column 12 causes the threaded grinding wheel 17 to move in the Xm axis (Xw axis) direction as shown by an arrow a, together with the column 12, the saddle 13, the turning head 14, and the grinding wheel head 16 (grinding wheel arbor 16a). Moreover, moving the saddle 13 causes the threaded grinding wheel 17 to move in the Zm axis (Zw axis) direction (upward and downward direction in the internal gear grinding machine 1) as shown in an arrow b, together with the saddle 13, the turning head 14, and the grinding wheel head 16 (grinding wheel arbor 16a). Moreover, turning the turning head 14 causes the threaded grinding wheel 17 to turn about the grinding wheel turning axis A as shown by an arrow c, together with the turning head 14 and the grinding wheel head 16 (grinding wheel arbor 16a). Note that, at this time, the Ym axis direction (moving direction of the grinding wheel head 16) also turns about the grinding wheel turning axis A, together with the turning head 14. Moving the grinding wheel head 16 causes the threaded grinding wheel 17 to move in the Ym axis direction as shown by an arrow d, together with the grinding wheel head 16 (grinding wheel arbor 16a). Then, rotating the grinding wheel main spindle in the grinding wheel head 16 causes the threaded grinding wheel 17 to rotate about the grinding wheel rotation axis B1 as shown by an arrow e, together with the grinding wheel main spindle and the grinding wheel arbor 16a.

Moreover, on the bed 11, a rotary table 18 is provided in front of the column 12 to be rotatable about the vertical workpiece rotation axis C1. On the top surface of the rotary table 18, a cylindrical mounting jig 19 is provided. The workpiece W being an internal gear is detachably attached to the inner circumferential surface of the upper end of the mounting jig 19. Accordingly, rotating the rotary table 18 causes the workpiece W to rotate about the workpiece rotation axis C1 as shown by an arrow i, together with the rotary table 18.

Moreover, on the bed 11, a dressing device 21 is provided at a lateral side of the rotary table 18. A disc-shaped disc dresser 22 for dressing the threaded grinding wheel 17 is detachably attached to the dressing device 21. The dressing device 21 includes a base unit 23 provided on the bed 11 and a turning unit 24 provided on top of the base unit 23. The turning unit 24 is supported by the base unit 23 to be rotationally indexable about a vertical dresser advance/retreat axis C2 (as shown in an arrow f) at a base end portion. A dresser rotation drive motor 25 is provided at the front end of the turning unit 24 to be turnable about a horizontal dresser turning axis B2 (as shown by an arrow g) passing through a space between the blade tips (blade surfaces) of the disc dresser 22. The output shaft of the dresser rotation drive motor 25 to which the disk dresser 22 is attached is rotatable about a dresser rotation axis C3 (as shown by an arrow h) orthogonal to the dresser turning axis B2.

Figure 2:
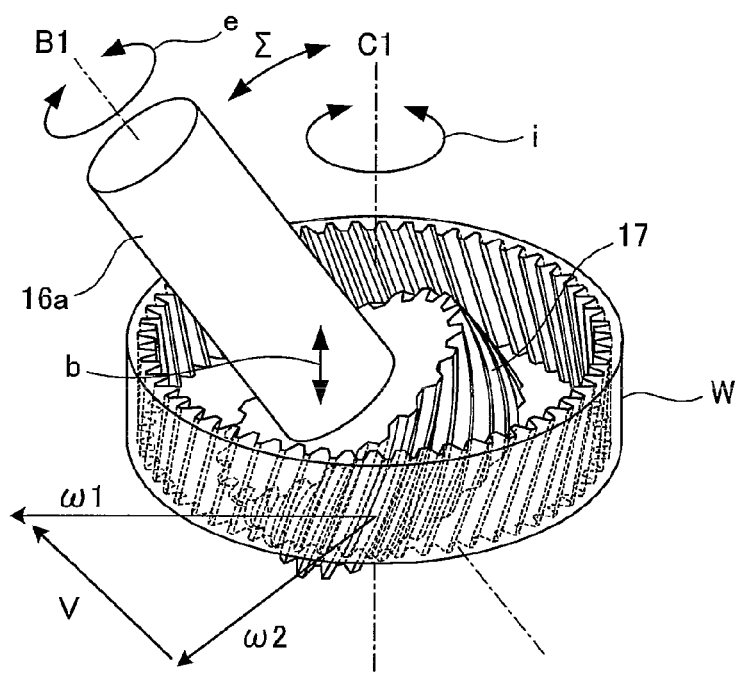
FIG. 2 is a perspective view showing a state where an internal gear is ground by a barrel-shaped threaded grinding wheel in the internal gear grinding machine.

Tooth profile grinding of the workpiece W by the internal gear grinding machine 1 with above described configuration is performed as follows. First, the workpiece W is attached to the mounting jig 19. Next, the column 12, the saddle 13, the turning head 14, and the grinding wheel head 16 are moved and turned in way that the threaded grinding wheel 17 is turned about the grinding wheel turning axis A to be set at a predetermined turning angle causing an crossed-axes angle E to correspond to the helix angle of the workpiece W, and then is moved to be disposed inside the workpiece W at a predetermined position in the Xm axis (Xw axis) direction, the Ym axis (Yw axis) direction, and the Zm axis (Zw axis) direction. Thereafter, the threaded grinding wheel 17 is further moved in the Xm axis (Xw axis) direction to mesh with the workpiece W. FIG. 2 shows this state where the threaded grinding wheel 17 and the workpiece W mesh with each other.

Figure 3:
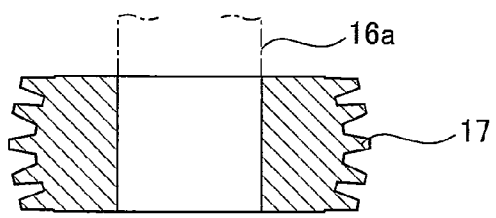
FIG. 3 is a vertical cross-sectional view of the barrel-shaped threaded grinding wheel.

As show in FIG. 3, the threaded grinding wheel 17 is formed into a barrel shape whose diameter gradually decreases from an axial center portion thereof to both of axial end portions thereof. Forming the threaded grinding wheel 17 into such a barrel shape allows the blades of the threaded grinding wheel 17 to mesh with the teeth of the workpiece W without causing the threaded grinding wheel 17 to interfere with the workpiece W even if the threaded grinding wheel 17 is inclined with respect to the workpiece W at the crossed-axes angle E as shown in FIG. 2. The threaded grinding wheel 17 has predetermined grinding wheel specifications to appropriately mesh with the workpiece W having predetermined workpiece specifications. The crossed-axes angle E is an angle formed by the workpiece rotation axis C1 and the grinding wheel rotation axis B1, and can be found from the helix angle of the workpiece W and the helix angle of the threaded grinding wheel 17.

After the threaded grinding wheel 17 and the workpiece W mesh with each other as shown in FIG. 2, the grinding wheel rotation axis B1 (threaded grinding wheel 17) and the workpiece rotation axis C1 (workpiece W) are synchronously rotated. Next, the threaded grinding wheel 17 is swung in the Zm axis (Zw axis) direction (moved up and down), while being moved in a direction (Xm axis direction) cutting into the workpiece W to a predetermined position. Thus, the threaded grinding wheel 17 cuts into the workpiece W, and the tooth surfaces of the workpiece W are ground by the blade surfaces of the threaded grinding wheel 17.

Figure 4:
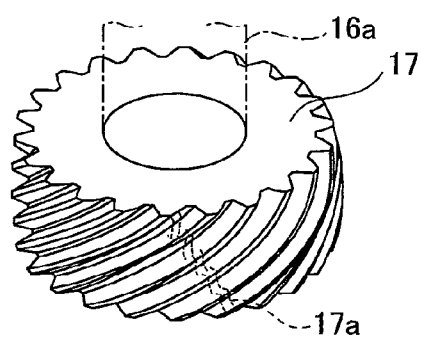
FIG. 4 is a perspective view of the barrel-shaped threaded grinding wheel.

Note that, the meshing position of the threaded grinding wheel 17 with the workpiece W in the grinding is a contact (meshing) line 17a as shown in FIG. 4. Specifically, in the grinding of the workpiece W by the threaded grinding wheel 17, multiple blade surfaces of the threaded grinding wheel 17 simultaneously grind multiple tooth surfaces of the workpiece W. Moreover, in the grinding, the threaded grinding wheel 17 rotates about the grinding wheel rotation axis B1 intersecting with the workpiece rotation axis C1 at the crossed-axes angle $\Sigma$. Thus, a slip velocity (grinding velocity) V is generated between the threaded grinding wheel 17 and the workpiece W as shown in FIG. 2. The slip velocity V is a relative velocity between a rotation angular velocity $\omega 2$ of the threaded grinding wheel 17 and a rotation angular velocity $\omega 1$ of the workpiece W at a position where the blade surfaces of the threaded grinding wheel 17 and the tooth surfaces of the workpiece W mesh with each other. Generation of such a slip velocity V allows the tooth surfaces of the workpiece W to be surely ground by the blade surfaces of the threaded grinding wheel 17.

Grinding a certain number of workpieces W with the threaded grinding wheel 17 causes the blade surfaces of the threaded grinding wheel 17 to wear, and the sharpness the threaded grinding wheel 17 decreases. Although detailed description is omitted, the dressing device 21 is regularly used to dress and re-sharpen the threaded grinding wheel 17.

Figure 5:
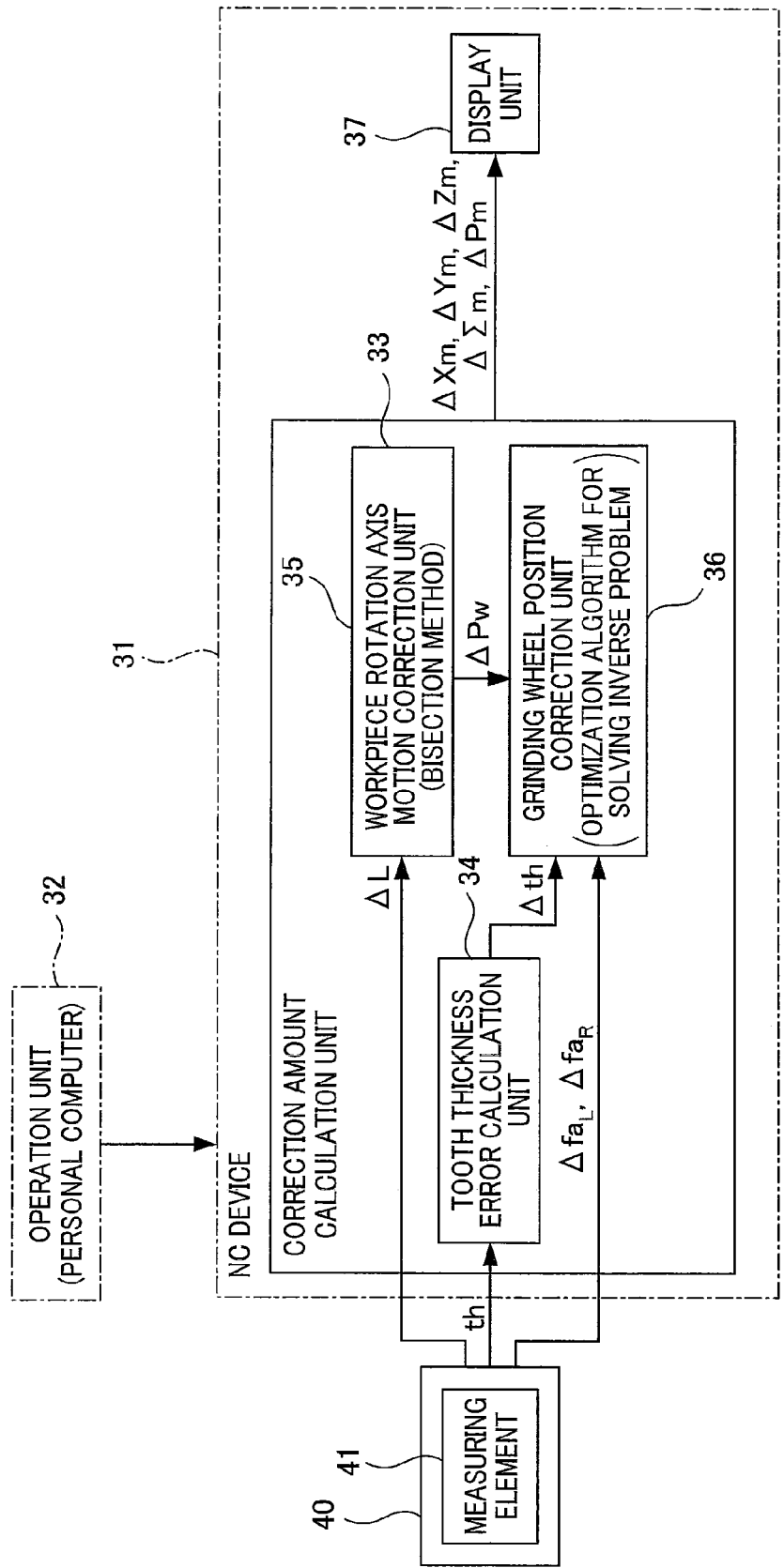
FIG. 5 is a block diagram of a NC control device controlling the internal gear grinding machine.

As shown in FIG. 5, in the embodiment, when the tooth profile grinding of the workpiece W is performed as described above by the internal gear grinding machine 1, an operation unit (personal computer) 32 calculates a machining target value in accordance with inputted information on the threaded grinding wheel 17 and the workpiece W. Based on this machining target value, a NC (numerical control) device 31 performs drive control of the units (axes) of the internal gear grinding machine 1.

Then, if there are tooth profile errors (pressure angle errors, a tooth trace error, and a tooth thickness error) of the workpiece W after the tooth profile grinding is completed, information needed to reduce the tooth profile errors is inputted into the NC device 31 also functioning as tooth profile error correction means. Thus, in the next grinding, the arrangement (positioning) and movement of the axes are corrected, and then the machining is performed.

Specifically, after the tooth profile grinding is completed, the tooth profile error correction means measures the left and right pressure angles, the tooth trace, and the tooth thickness of the tooth surface of the ground workpiece W. Then, from the thus measured values, pressure angle errors $\Delta fa_L$, $\Delta fa_R$, a tooth trace error $\Delta L$, and a tooth thickness error $\Delta th$ are calculated. Thereafter, the NC device 31 instructed to reduce the pressure angle errors $\Delta fa_L$, $\Delta fa_R$, the tooth trace error $\Delta L$, and the tooth thickness error $\Delta th$ calculates a grinding wheel radial direction (Xw axis direction) position error $\Delta X$, a grinding wheel lateral direction (Yw axis direction) position error $\Delta Y$, and a grinding wheel turning angle (A axis) error $\Delta \Sigma$ with respect to the position errors of the threaded grinding wheel 17, and calculates a helical motion error $\Delta P$. Then, the NC device 31 determines correction amounts for movement (positions) of the threaded grinding wheel 17 in the internal gear grinding machine 1 in the Xm axis direction, the Ym direction, and the Zm direction, the turning angle (crossed-axes angle $\Sigma$) about the grinding wheel turning axis A, and the rotation speed about the workpiece rotation axis C1, with respect to the errors $\Delta X$, $\Delta Y$, $\Delta \Sigma$, $\Delta P$, and performs correction. Then, the tooth profile grinding of the next workpiece W is performed.

The radial position error $\Delta X$ is a position error of the threaded grinding wheel 17 in the Xm axis (Xw axis) direction (direction to cut into the workpiece W). The grinding wheel lateral position error $\Delta Y$ is a position error of the threaded grinding wheel 17 in the Yw axis direction. Note that, the grinding wheel turning axis B1 is inclined with respect to the workpiece rotation axis C1 at the crossed-axes angle $\Sigma$ in the tooth profile grinding. Accordingly, the Ym axis is also inclined with respect to the Yw axis of the reference axes. Thus, the grinding wheel lateral position error $\Delta Y$ needs to be corrected in the following way. The correction amount for the grinding wheel lateral position error $\Delta Y$ is converted into a correction amount for the Ym axis direction position in accordance with the inclination angle (corresponding to the crossed-axes angle $\Sigma$) of the Ym axis with respect to the Yw axis, and the Ym axis direction position is corrected based on this correction amount. Note that, if the position correction in the Ym axis direction is performed as described above, the Zm axis (Zw axis) direction position also changes, and this causes displacement of a contact position between the threaded grinding wheel 17 and the workpiece W such as a machining start position of the threaded grinding wheel 17 in the Zm axis (Zw axis) direction. Accordingly, when the position correction in the Ym axis direction is performed, it is desirable to also perform the position correction in the Zm axis (Zw axis) direction so as not to displace the contact position. Accordingly, the position correction in the Zm axis (Zw axis) direction is also performed in the internal gear grinding machine 1 of the embodiment. Note that, the position error (correction amount) in the Xm axis direction is the same as the position error (correction amount) in the Xw axis direction, and the correction amount for the Zm axis direction position is the same as the correction amount for the Zw axis direction position.

The grinding wheel turning angle error $\Delta \Sigma$ is a turning angle error of the threaded grinding wheel 17 about the grinding wheel turning axis A, i.e. an error of the crossed-axes angle $\Sigma$. The helical motion error $\Delta P$ is a synchronization error between the swinging (up and down) motion of the threaded grinding wheel 17 in the Zm axis (Zw axis) direction and the rotary motion of the workpiece W about the workpiece rotation axis C1. Here, the rotary motion of the workpiece W about the workpiece rotation axis C1 is corrected with respect to the rotary motion of the threaded grinding wheel 17 about the grinding wheel rotation axis B1 and the swinging (up and down) motion thereof in the Zm axis direction.

The tooth profile of the workpiece W is measured, for example, every time a predetermined number of internal gears are machined, or when the threaded grinding wheel 17 is replaced with a new one. Tooth profile measurement means may be a gear accuracy measuring device installed in the internal gear grinding machine 1 or a general gear measuring machine which is dedicated to gear accuracy measurement and which is provided outside the internal gear grinding machine 1 (in other words, an external measuring machine). In the case of using the external measuring machine, the workpiece W subjected to tooth profile grinding is removed from the internal gear grinding machine 1, and placed in the external measuring machine to measure the tooth profile of the workpiece W.

Figure 6:
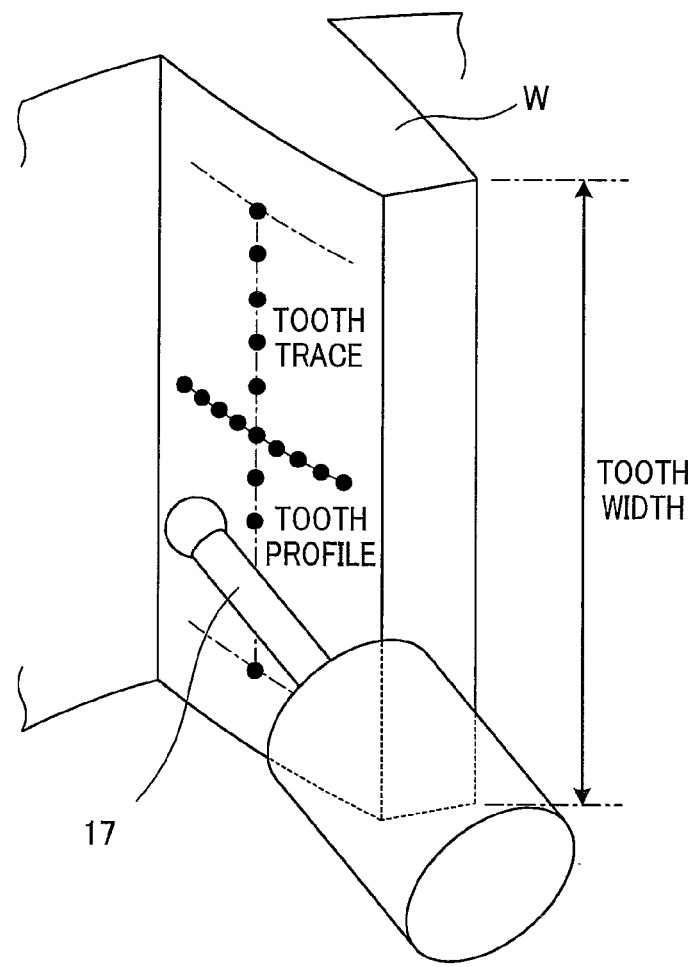
FIG. 6 is a view showing tooth profile measurement.

FIG. 6 shows an example of a state in which the tooth profile of the workpiece W subjected to tooth profile grinding is measured by a measuring element 41 of a gear accuracy measuring device 40 (see FIG. 5) installed in the internal gear grinding machine 1. As shown in FIG. 6, the measuring element 41 and the workpiece W are moved in accordance with a machining target value to detect contact sensation of the front end portion of the measuring element 41 with the surfaces (tooth surfaces) of the workpiece W. In this way, the measuring element 41 can measure the left and right pressure angles, the tooth trace, and the tooth thickness of the tooth surface of the workpiece W. Then, the pressure angle errors $\Delta fa_L$, $\Delta fa_R$, the tooth trace error $\Delta L$, and the tooth thickness error $\Delta th$ are calculated from the measured values. Here, the pressure angle errors $\Delta fa_L$, $\Delta fa_R$ are represented using a point sequence including 100 points at the maximum in Xw axis-Yw axis coordinates, and the tooth trace error $\Delta L$ is represented using a point sequence including 100 points at the maximum in Zw axis-Yw axis coordinates. Then, the measurement results of the measuring element 41 are outputted to the operation unit 32 via the NC device 31. Note that, the tooth thickness error $\Delta th$ is calculated from a tooth thickness th by the NC device 31.

Now, descriptions are given of methods of the NC device 31 calculating correction amounts $\Delta Xm$, $\Delta Ym$, $\Delta \Sigma m$, and $\Delta Pm$ for the axes of the internal gear grinding machine 1 with respect to the radial position error $\Delta X$, the grinding wheel lateral position error $\Delta Y$, the grinding wheel turning angle error $\Delta \Sigma$, and the helical motion error $\Delta P$, and calculating a correction amount $\Delta Zm$ for the Zm axis direction position.

As shown in FIG. 5, the gear accuracy measuring device 40 outputs the pressure angle errors $\Delta fa_L$, $\Delta fa_R$, the tooth trace error $\Delta L$, and the tooth thickness th measured by the measuring element 41 to a correction amount calculation unit 33 of the NC device 31. Here, the pressure angle errors $\Delta fa_L$, $\Delta fa_R$ and the tooth trace error $\Delta L$ are calculated from the left and right pressure angles and the tooth trace of the tooth surface of the workpiece W which are measured by the measuring element 41. Note that, in the case of using the external measuring machine, the left and right pressure angle errors $\Delta fa_L$, $\Delta fa_R$, the tooth trace error $\Delta L$, and the tooth thickness error $\Delta th$ of the workpiece W measured by the external measuring machine are transmitted to the NC device 31 either directly or via the operation unit 32.

The correction amount calculation unit 33 includes a tooth thickness error calculation unit 34, a workpiece rotation axis motion (helical motion) correction unit 35, and a grinding wheel position correction unit 36. The tooth thickness error calculation unit 34 calculates the tooth thickness error $\Delta th$ from a target tooth thickness and the measured tooth thickness th. The workpiece rotation axis motion correction unit 35 sets a correction amount $\Delta Pm$ for the helical motion error (workpiece rotation axis motion error) $\Delta P$ on the basis of the pressure angle errors $\Delta fa_L$, $\Delta fa_R$, the tooth trace error $\Delta L$, and the tooth thickness error $\Delta th$. The grinding wheel position correction unit 36 sets the correction amount $\Delta Xm$ for the radial position error $\Delta X$, the correction amount $\Delta Ym$ for the grinding wheel lateral position error $\Delta Y$, and the correction amount $\Delta \Sigma m$ for the grinding wheel turning angle error $\Delta \Sigma$ on the basis of the pressure angle errors $\Delta fa_L$, $\Delta fa_R$ and the tooth thickness error $\Delta th$. Moreover, the grinding wheel position correction unit 36 also sets the correction amount $\Delta Zm$ for the Zm axis direction position.

In this configuration, the workpiece rotation axis motion correction unit 35 and the grinding wheel position correction unit 36 analyze in advance the influences of the radial position error $\Delta X$, the grinding wheel lateral position error $\Delta Y$, the grinding wheel turning angle error $\Delta \Sigma$, and the helical motion error $\Delta P$ on the pressure angle errors $\Delta fa_L$, $\Delta fa_R$, the tooth trace error $\Delta L$, and the tooth thickness error $\Delta th$. The analysis is one in which a differential coefficient (influence coefficient) is calculated, and is performed in consideration of the workpiece specifications of the workpiece W (internal gear). Moreover, the tooth profile measuring means (gear accuracy measuring device 40) measures the tooth profile errors (the pressure angle errors $\Delta fa_L$, $\Delta fa_R$, the tooth trace error $\Delta L$, and the tooth thickness error $\Delta th$) of the workpiece W.

Then, based on the measurement results of the tooth profile errors and the analysis result (differential coefficient (influence coefficient)) described above, correction amounts on the coordinate axes based on the workpiece, namely a correction amount $\Delta Xw$ for the radial position error $\Delta X$, a correction amount $\Delta Yw$ for the grinding wheel lateral position error $\Delta Y$, a correction amount $\Delta \Sigma w$ for the grinding wheel turning angle error $\Delta \Sigma$, and a correction amount $\Delta Pw$ for the helical motion error $\Delta P$ are calculated that cause the pressure angle errors $\Delta fa_L$, $\Delta fa_R$, the tooth trace error $\Delta L$, and the tooth thickness error $\Delta th$ to be reduced (to be minimum). $\Delta Xw$ is a correction amount for the $\Delta w$ axis direction position, and $\Delta Yw$ is a correction amount for the $\Delta w$ axis direction position.

Next, the correction amounts $\Delta Xm$, $\Delta Ym$, $\Delta \Sigma m$, and $\Delta Pm$ on the axes of the internal gear grinding machine 1 are set based on the calculated correction amounts $\Delta Xw$, $\Delta Yw$, $\Delta \Sigma w$, and $\Delta Pw$ on the coordinate axes based on the workpiece. At this time, the correction amounts $\Delta Xm$, $\Delta \Sigma m$, and $\Delta Pm$ are set to the same values as the correction amounts $\Delta Xw$, $\Delta Yw$, $\Delta \Sigma w$, and $\Delta Pw$, respectively. Meanwhile, the correction amount $\Delta Ym$ is set as follows. The correction amount $\Delta Yw$ is converted into the correction amount $\Delta Ym$ on the basis of the inclination angle of the Ym axis with respect to the Yw axis in a way that the Yw axis direction component in the correction amount $\Delta Ym$ becomes the same as that in the correction amount $\Delta Yw$. Moreover, the correction amount $\Delta Zm$ for the Zm axis direction position is set in a way that there is no displacement of the contact position between the threaded grinding wheel 17 and the workpiece W such as the machining start position, due to the setting of the correction amount $\Delta Ym$.

Note that, the illustrated example shows the case where the workpiece W (internal gear) is a helical gear; however, in the case where the workpiece W (internal gear) is a spur gear, the correction amount $\Delta Pw$ ($\Delta Pm$) for the helical motion error $\Delta P$ is set to zero (null).

The following shows a method for calculating the correction amount $\Delta Xw$ for the radial position error $\Delta X$, the correction amount $\Delta Yw$ for the grinding wheel lateral position error $\Delta Y$, the correction amount $\Delta \Sigma w$ for the grinding wheel turning angle error $\Delta \Sigma$, and the correction amount $\Delta Pw$ for the helical motion error $\Delta P$ from the pressure angle errors $\Delta fa_L$, $\Delta fa_R$, the tooth trace error $\Delta L$, and the tooth thickness error $\Delta th$.

The inventors of the present application first performed a simulation (numerical calculation) of the tooth profile grinding using the barrel-shaped threaded grinding wheel 17 to examine the influences of the radial position error $\Delta X$, the grinding wheel lateral position error $\Delta Y$, the grinding wheel turning angle error $\Delta \Sigma$, and the helical motion error $\Delta P$ on the pressure angle errors $\Delta fa_L$, $\Delta fa_R$, the tooth trace error $\Delta L$, and the tooth thickness error $\Delta th$ when the tooth profile grinding of the workpiece W (internal gear) is performed using the barrel-shaped threaded grinding wheel 17. The inventors found out the following fact from the simulation result. In the case where the workpiece W (internal gear) is ground with the barrel-shape threaded grinding wheel 17, unlike the case where an external gear is ground with a cylindrical threaded grinding wheel, the tooth profile of the workpiece W (internal gear) changes when the relative position between the barrel-shaped threaded grinding wheel 17 and the workpiece W (internal gear) changes, and the tooth profile errors (the pressure angle errors $\Delta fa_L$, $\Delta fa_R$, the tooth trace error $\Delta L$, and the tooth thickness error $\Delta th$) occur in the workpiece W.

Furthermore, the inventors also found out the following fact from the simulation result. As shown in the table of FIG. 7, the pressure angle errors $\Delta fa_L$, $\Delta fa_R$ are affected by all the items of the radial position error $\Delta X$, the grinding wheel lateral position error $\Delta Y$, the grinding wheel turning angle error $\Delta \Sigma$, and the helical motion error $\Delta P$. Meanwhile, the tooth trace error $\Delta L$ is affected only by one item of the helical motion error $\Delta P$, and the tooth thickness error $\Delta th$ is affected by three items of the radial position error $\Delta X$, the grinding wheel turning angle error $\Delta \Sigma$, and the helical motion error $\Delta P$.

Figure 8A:
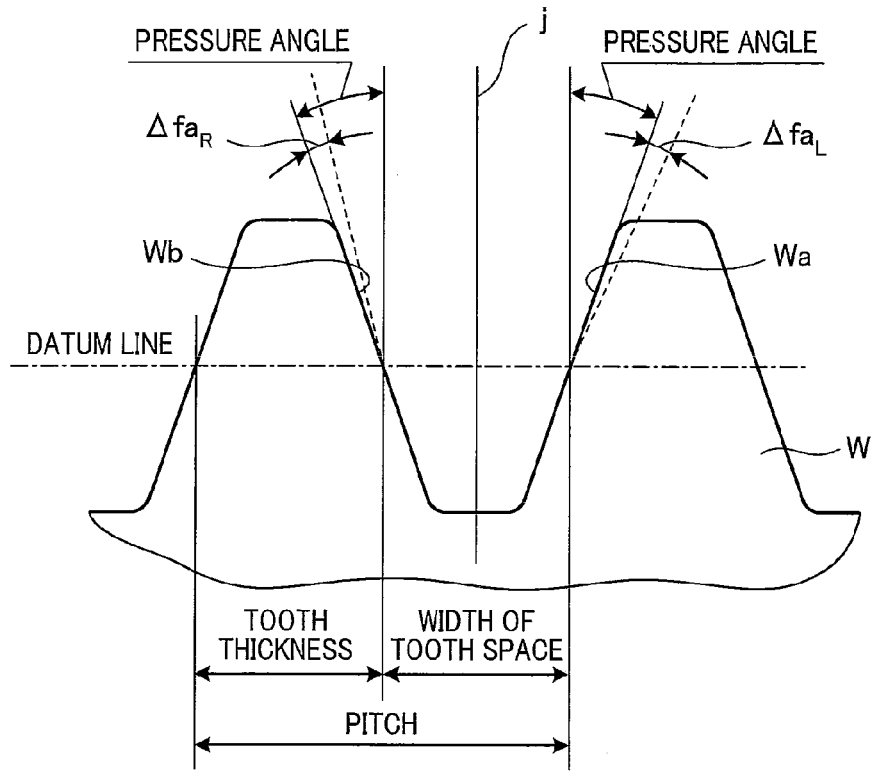
FIG. 8 Part (a) is a view showing an example of asymmetric pressure angle errors, and Part (b) is a view showing an example of symmetric pressure angle errors.
Figure 8B:
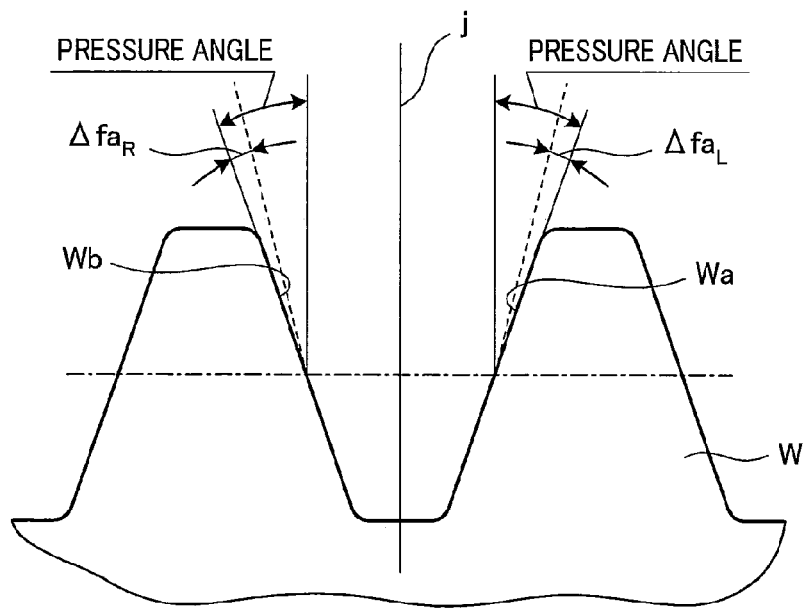

In addition, the inventors also found out the following fact from the simulation result. The influence of the grinding wheel lateral position error $\Delta Y$ on the pressure angle errors $\Delta fa_L$, $\Delta fa_R$ emerges as asymmetrical pressure angle errors $\Delta fa_L$, $\Delta fa_R$. Meanwhile the influences of the radial position error $\Delta X$ and the grinding wheel turning angle error $\Delta \Sigma$ on the pressure angle errors $\Delta fa_L$, $\Delta fa_R$ emerge as symmetrical pressure angle errors $\Delta fa_L$, $\Delta fa_R$. Note that, the asymmetrical pressure angle errors $\Delta fa_L$, $\Delta fa_R$ mean that the pressure angles at the left and right tooth surfaces Wa, Wb of the teeth of the workpiece W are as shown in Part (a) of FIG. 8. Specifically, the measured pressure angles are in the state shown by dotted lines with respect to the design (target) pressure angle shown by solid lines, i.e., the pressure angle errors $\Delta fa_L$, $\Delta fa_R$ occur which are asymmetrical about a center line j of a tooth space. Moreover, the symmetrical pressure angle errors $\Delta fa_L$, $\Delta fa_R$ mean that the pressure angles at the left and right tooth surfaces Wa, Wb of the teeth of the workpiece W are as shown in Part (b) of FIG. 8. Specifically, the measured pressure angles are in the state shown by dotted lines with respect to the design (target) pressure angle shown by solid lines, i.e., the pressure angle errors $\Delta fa_L$, $\Delta fa_R$ occur which are symmetrical about the center line j of the tooth space.

Next, a tooth profile error propagation analysis was performed to analyze how the errors (the radial position error $\Delta X$, the grinding wheel lateral position error $\Delta Y$, the grinding wheel turning angle error $\Delta \Sigma$, and the helical motion error $\Delta P$) in the internal gear grinding machine 1 are propagated as the tooth profile errors (the pressure angle errors $\Delta fa_L$, $\Delta fa_R$, the tooth trace error $\Delta L$, and the tooth thickness error $\Delta th$) of the workpiece W (internal gear). As a result, the following tooth profile error propagation formulae (1) to (4) for respective error amounts were obtained. Note that, if the workpiece W (internal gear) is a spur gear, the helical motion error $\Delta P$ is zero (null).

[Formula 1]

Radial Position Error $\Delta X$ (1)

$$\begin{bmatrix} \Delta x_0 \\ \Delta y_0 \end{bmatrix} = \begin{bmatrix} \frac{\partial x_0}{\partial \Delta x} \\ \frac{\partial y_0}{\partial \Delta x} \end{bmatrix} \Delta x$$

[Formula 2]

Helical Motion Error $\Delta P$ (2)

$$\begin{bmatrix} \Delta x_0 \\ \Delta y_0 \end{bmatrix} = \begin{bmatrix} \frac{\partial x_0}{\partial p} \\ \frac{\partial y_0}{\partial p} \end{bmatrix} \Delta p$$

[Formula 3]

Grinding Wheel Turning Angle Error $\Delta \Sigma$ (3)

$$\begin{bmatrix} \Delta x_0 \\ \Delta y_0 \end{bmatrix} = \begin{bmatrix} \frac{\partial x_0}{\partial \Sigma} \\ \frac{\partial y_0}{\partial \Sigma} \end{bmatrix} \Delta \Sigma$$

[Formula 4]

Grinding Wheel Lateral Position Error $\Delta Y$ (4)

$$\begin{bmatrix} \Delta x_0 \\ \Delta y_0 \end{bmatrix} = \begin{bmatrix} \frac{\partial x_0}{\partial \Delta Y} \\ \frac{\partial y_0}{\partial \Delta Y} \end{bmatrix} \Delta Y$$

From the above analysis results, the correction amounts $\Delta Xw$, $\Delta Yw$, $\Delta \Sigma w$, and $\Delta Pw$ for the errors (the radial position error $\Delta X$, the grinding wheel lateral position error $\Delta Y$, the grinding wheel turning angle error $\Delta \Sigma$, and the helical motion error $\Delta P$) to correct (reduce) the tooth profile errors (the pressure angle errors $\Delta fa_L$, $\Delta fa_R$, the tooth thickness error $\Delta th$, and the tooth trace error $\Delta L$) are found in the following order of (1) to (3).

(1) First, the correction amount $\Delta Pw$ for the helical motion error $\Delta P$ is found as a correction amount to correct (reduce) the tooth trace error $\Delta L$. The found correction amount $\Delta Pw$ for the helical motion error $\Delta P$ is also used as a correction amount to correct (reduce) the pressure angle errors $\Delta fa_L$, $\Delta fa_R$, and as a correction amount to correct (reduce) the tooth thickness error $\Delta th$.

(2) Next, the correction amount $\Delta Yw$ for the radial position error $\Delta Y$ is found as a correction amount to correct (reduce) the asymmetrical pressure angle errors $\Delta fa_L$, $\Delta fa_R$.

(3) Next, the correction amount $\Delta Xw$ for the radial position error $\Delta X$ and the correction amount $\Delta \Sigma w$ for the grinding wheel turning angle error $\Delta \Sigma$ are found as correction amounts to correct (reduce) the symmetrical pressure angle errors $\Delta fa_L$, $\Delta fa_R$ and the tooth thickness error $\Delta th$.

Now, the correction amounts $\Delta Xw$, $\Delta Yw$, $\Delta \Sigma w$, and $\Delta Pw$ will be described in detail. From the above analysis result, only the correction amount $\Delta Pw$ for the helical motion error $\Delta P$ is used to correct (reduce) the tooth trace error $\Delta L$, and, firstly, the correction amount $\Delta Pw$ for the helical motion error $\Delta P$ is calculated from the measured tooth trace error $\Delta L$ by using a bisection method.

Next, in consideration of this correction amount $\Delta Pw$ for the helical motion error $\Delta P$, the correction amount $\Delta Xw$ for the radial position error $\Delta X$, the correction amount $\Delta Yw$ for the grinding wheel lateral position error $\Delta Y$, and the correction amount $\Delta \Sigma w$ for the grinding wheel turning angle error $\Delta \Sigma$ which correct (reduce) the pressure angle errors $\Delta fa_L$, $\Delta fa_R$ and the tooth thickness error nth are calculated using an optimization algorithm for solving an inverse problem such as a downhill simplex method. The inverse problem is a problem for calculating a cause from an effect, as is well known. Here, the optimization algorithm for solving the inverse problem is used to calculate the errors (correction amounts) of the axes which are causes, from the tooth profile errors which are effects.

In the optimization algorithm for solving the inverse problem (downhill simplex method or the like), the sum of the square value of the pressure angle error $\Delta fa_L$ of the left tooth surface and the square value of the pressure angle error $\Delta fa_R$ of the right tooth surface is set as an evaluation function for the asymmetrical pressure angle errors $\Delta fa_L$, $\Delta fa_R$. Then, the correction amount $\Delta Yw$ for the grinding wheel lateral position error $\Delta Y$ which minimizes the evaluation function is found. Moreover, in the optimization algorithm for solving the inverse problem (downhill simplex method or the like), the sum of the square value of the pressure angle error $\Delta fa_L$ of the left tooth surface, the square value of the pressure angle error $\Delta fa_R$ of the right tooth surface, and the square value of the tooth thickness error $\Delta th$ is set as an evaluation function for the symmetrical pressure angle errors $\Delta fa_L$, $\Delta fa_R$ and the tooth thickness error $\Delta th$. Then, the correction amount $\Delta Xw$ for the radial position error $\Delta X$ and the correction amount $\Delta \Sigma w$ for the grinding wheel turning angle error $\Delta \Sigma$ which minimize the evaluation function are found. In other words, a correction amount $\Delta Xw$ for the radial position error $\Delta X$ and a correction amount $\Delta \Sigma w$ for the grinding wheel turning angle error $\Delta \Sigma$ are found which can correct (reduce) both the asymmetrical pressure angle errors $\Delta fa_L$, $\Delta fa_R$ and the tooth thickness error $\Delta th$.

For example, if the workpiece W (internal gear) is a helical gear, firstly, the correction amount $\Delta Pw$ for the helical motion error $\Delta P$ needs to be found to correct (reduce) the tooth trace error $\Delta L$. In the tooth profile error propagation analysis, the tooth trace error $\Delta L$ is expressed in the Zw-Yw coordinates. In this respect, a tooth profile curve (shown by dashed lines in FIG. 6) is found at each of end portions in a tooth width direction as shown in FIG. 6, a tooth trace chart is obtained by finding a degree of error near a pitch circle for each tooth profile curve, to thereby find the tooth trace error $\Delta L$. How the tooth trace chart changes when there is the helical motion error $\Delta P$ is found by using the aforementioned (2) formula.

Figure 9A:
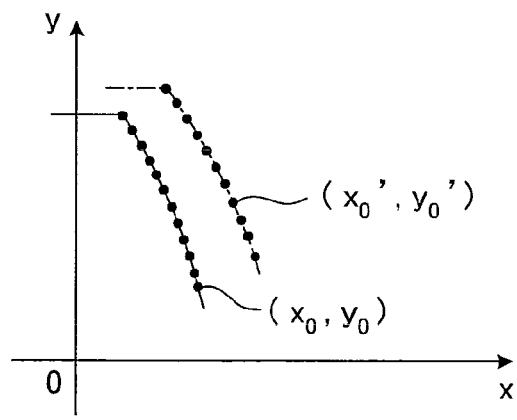
FIG. 9 Part (a) is an involute tooth profile for explaining a tooth profile error propagation analysis, and Parts (b) and (c) are tooth profile charts for explaining the tooth profile error propagation analysis.
Figure 9B:
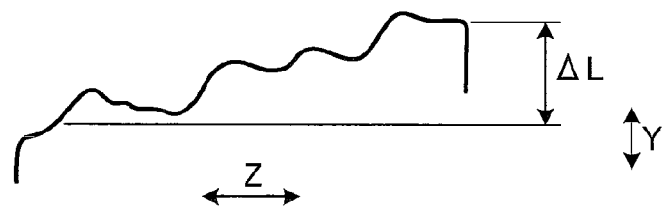

In the tooth profile error propagation analysis, a point sequence $(X_0, Y_0)$ of an involute tooth profile is as shown in Part (a) of FIG. 9, and the tooth profile chart matches the machining target value when the radial position error $\Delta X=0$ and the grinding wheel lateral position error $\Delta Y=0$. Accordingly, an appropriate value is inputted into the helical motion error $\Delta P$ in the (2) formula to find a point sequence $(X_0', Y_0')$ of an involute tooth profile shown in Part (a) of FIG. 9 in each of the end portions in the tooth width direction. In this case, the following equations are satisfied:

$$\Delta X = X_0' - X_0$$

$$\Delta Y = Y_0' - Y_0$$

Tooth trace errors $\Delta L_T'$, $\Delta L_B'$ at the upper end and the lower end in the tooth width direction are found from $\Delta X$, $\Delta Y$, and the total of $\Delta L_T'$, $\Delta L_B'$ is set as a tooth trace error $\Delta L'$ near the pitch circle. Thus, the tooth profile chart as shown in Part (b) of FIG. 9 is obtained.

From the tooth trace error $\Delta L'$ thus found, the correction amount $\Delta Pw$ for the helical motion error $\Delta P$ is found by using a bisection method. In other words, the difference between the tooth trace error $\Delta L'$ and the measured tooth trace error $\Delta L$ being zero means that the actual helical motion error $\Delta P$ is accurately estimated, and, in actual, is the same as finding the correction amount $\Delta Pw$ for the helical motion error $\Delta P$ which minimizes the evaluation function.

After the correction amount $\Delta Pw$ for the helical motion error $\Delta P$ is set as described above, the correction amount $\Delta Yw$ for the grinding wheel lateral position error $\Delta Y$, the correction amount $\Delta Xw$ for the radial position error $\Delta X$, and the correction amount $\Delta \Sigma w$ for the grinding wheel turning angle error $\Delta \Sigma$ are found from the pressure angle errors $\Delta fa_L$, $\Delta fa_R$ at the left and right tooth surfaces and the tooth thickness error $\Delta th$. In this case, however, the influence of the correction amount $\Delta Pw$ for the helical motion error $\Delta P$ on the pressure angle errors $\Delta fa_L$, $\Delta fa_R$ and the tooth thickness error $\Delta th$ needs to be considered. In other words, $\Delta X_0$, $\Delta Y_0$ are found from the helical motion error $\Delta P$ by using (2) formula described above.

In the tooth profile error propagation analysis, the point sequence $(X_0, Y_0)$ of the involute tooth profile is as shown in Part (a) of FIG. 9, and the tooth profile chart matches the machining target value when the radial position error (Xw axis direction position error) $\Delta X=0$ and the grinding wheel lateral position error $\Delta Y=0$, and therefore the pressure angle error $\Delta fa_L=0$ and the pressure angle error $\Delta fa_R=0$. How the tooth profile chart changes when there is the grinding wheel lateral position error $\Delta Y$ is found by using the aforementioned (4) formula. Specifically, an appropriate value is inputted into $\Delta Y$ in the (4) formula to find the point sequence $(X_0', Y_0')$ of the involute tooth profile shown in Part (a) of FIG. 9. In this case, the following equations are satisfied:

$$X_0' = X_0 + \Delta X$$

$$Y_0' = Y_0 + \Delta Y$$

Figure 9C:
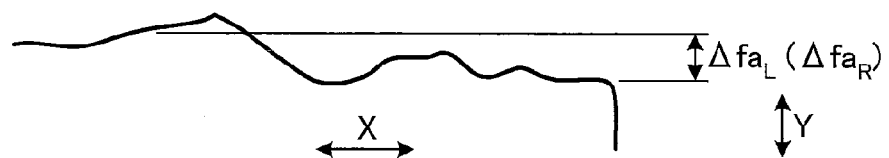

$\Delta X_0$, $\Delta Y_0$ found from the helical motion error $\Delta P$ by using the (2) formula are added to $X_0'$, $Y_0'$. Thus, a tooth profile chart as shown in FIG. 9(c) is obtained from the found data $(X_0', Y_0')$, and the pressure angle error $\Delta fa_L'$ ($\Delta fa_R'$) can be found.

The correction amount $\Delta Yw$ for the grinding wheel lateral position error $\Delta Y$ is found from the pressure angle errors $\Delta fa_L'$ $\Delta fa_R'$ thus found by using the optimization algorithm for solving the inverse problem (downhill simplex method or the like). The evaluation function f in this case is given from the following formula.

$$f = (\Delta fa_L' - \Delta fa_L)^2 + (\Delta fa_R' - \Delta fa_R)$$

If the correction amount $\Delta Yw$ for the grinding wheel lateral position error $\Delta Y$ estimated using this formula leads to f=0 (or being the minimum) in the evaluation formula f, this means that the actual grinding wheel lateral position error $\Delta Y$ is accurately estimated, and, in actual, is the same as finding the correction amount $\Delta Yw$ for the grinding wheel lateral position error $\Delta Y$ which minimizes the evaluation function f.

Moreover, in a similar way, an appropriate value is inputted into the radial position error $\Delta X$ by using the (1) formula described above, and the point sequence $(X_0', Y_0')$ of the involute tooth profile is thus found. Next, a tooth profile chart is obtained from the found data $(X_0', Y_0')$, and the pressure angle errors $\Delta fa_L'$, $\Delta fa_R'$ are found.

Moreover, in a similar way, an appropriate value is inputted into the grinding wheel turning angle error $\Delta \Sigma$ by using the (3) formula described above, and the point sequence $(X_0', Y_0')$ of the involute tooth profile is thus found. Next, a tooth profile chart is obtained from the found data $(X_0', Y_0')$, and a tooth thickness error $\Delta th'$ is found.

The correction amount $\Delta Xw$ for the radial position error $\Delta X$ and the correction amount $\Delta \Sigma w$ for the grinding wheel turning angle error $\Delta \Sigma$ are found from the pressure angle errors $\Delta fa_L'$, $\Delta fa_R'$ and the tooth thickness error $\Delta th'$ thus found by using the optimization algorithm for solving the inverse problem (downhill simplex method or the like). The evaluation function f in this case is given from the following formula.

$$f = (\Delta fa_L' - \Delta fa_L)^2 + (\Delta fa_R' - \Delta fa_R) + (\Delta th' - \Delta th)^2$$

If the correction amounts $\Delta Xw$, $\Delta \Sigma w$ for the radial position error $\Delta X$ and the grinding wheel turning angle error $\Delta \Sigma$ estimated from this formula leads to f=0 (or being the minimum) in the evaluation function f, this means that the actual radial position error $\Delta X$ and grinding wheel turning angle error $\Delta \Sigma$ are accurately estimated, and, in actual, is the same as finding the correction amounts $\Delta Xw$, $\Delta \Sigma w$ for the radial position error $\Delta X$ and the grinding wheel turning angle error $\Delta \Sigma$ which minimize the evaluation function f.

Then, the correction amounts $\Delta Xm$, $\Delta Ym$, $\Delta \Sigma m$, and $\Delta Pm$ on the axes of the internal gear grinding machine 1 are set based on the correction amounts $\Delta Xw$, $\Delta Yw$, $\Delta \Sigma w$, and $\Delta Pw$ thus found. At this time, the correction amounts $\Delta Xm$, $\Delta \Sigma m$, and $\Delta Pm$ are set to the same values as the $\Delta Xw$, $\Delta Yw$, $\Delta \Sigma w$, and $\Delta Pw$, respectively. Meanwhile, the correction amount $\Delta Ym$ is set by converting the correction amount $\Delta Yw$ into the correction amount $\Delta Ym$ on the basis of the inclination angle of the Ym axis with respect to the Yw axis. Moreover, the correction amount $\Delta Zm$ for the Zm axis direction position is set in a way that there is no displacement of the contact position between the threaded grinding wheel 17 and the workpiece W such as the machining start position, due to the setting of the correction amount $\Delta Ym$. Note that, if the workpiece W (internal gear) is a spur gear, the correction amount $\Delta Pw$ ($\Delta Pm$) for the helical motion error $\Delta P$ is set to zero (null).

Figure 10A:
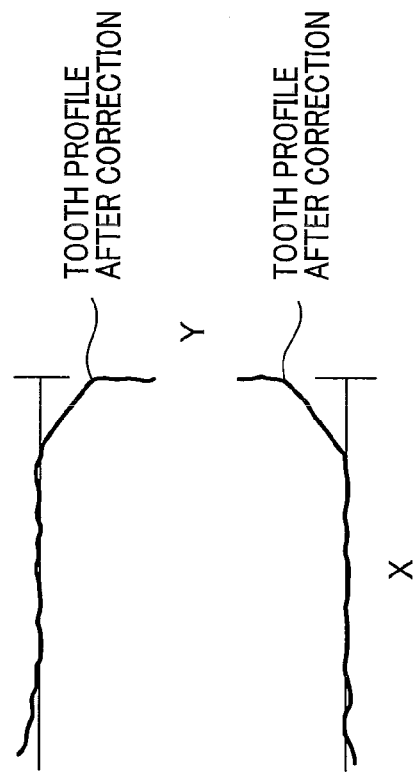
FIG. 10 Part (a) is a tooth profile chart showing a tooth profile before correction, and Part (b) is a tooth profile chart showing a tooth profile after the correction.
Figure 10B:
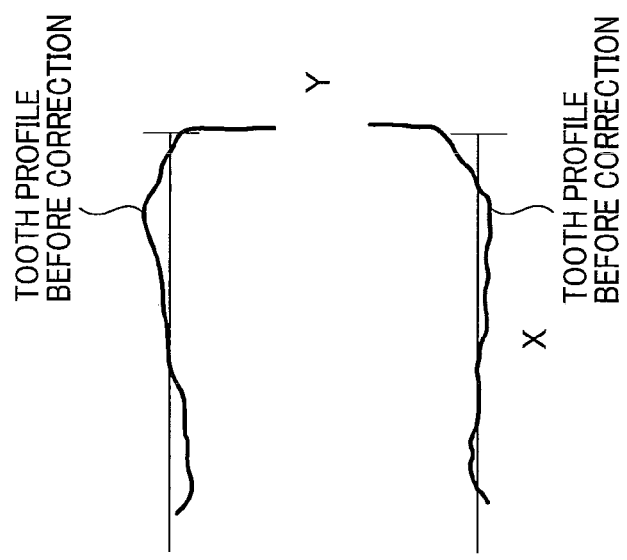

Such calculations are performed in the NC device 31 shown in FIG. 5. A display unit 37 of the NC device 31 displays the pressure angle error $\Delta fa_L$ of the left tooth surface, the pressure angle error $\Delta fa_R$ of the right tooth surface, the tooth trace error $\Delta L$, and the tooth thickness error Δth as measurement data of the workpiece W. Moreover, by operations of the operation unit 32, the correction amount ΔXm for the radial position error ΔX, the correction amount ΔYm for the grinding wheel lateral position error ΔY, the correction amount ΔΣm for the grinding wheel turning angle error ΔΣ, the correction amount ΔPw for the helical motion error ΔP, and the correction amount ΔΣm for the Zm axis direction position are calculated by the NC device 31 and displayed on the display unit 37. Accordingly, the NC device 31 corrects the Xm axis direction position (depth of cut), the Y axis direction position, and the Z axis direction position of the threaded grinding wheel 17, as well as the turning angle (crossed-axes angle Σ) about the grinding wheel turning axis A and the rotation speed of the workpiece W about the workpiece rotation axis C1, on the basis of the correction amounts ΔXm, ΔYm, ΔZm, ΔΣm, and ΔPm. Thus, the tooth profile of the workpiece W can be ground into a tooth profile close to the machining target value as shown in Part (b) of FIG. 10, for example.

As described above, according to the internal gear grinding machine 1 of the embodiment, the measured pressure angle errors $\Delta fa_L$, $\Delta fa_R$ in the tooth surface of the workpiece W (internal gear) are reduced by correcting the radial position, the grinding wheel lateral position, the grinding wheel turning angle, and the helical motion; the measured tooth trace error ΔL in the tooth surface of the workpiece W is reduced by correcting the helical motion; and the measured tooth thickness error Δth in the tooth surface of the workpiece W is reduced by correcting the radial position, the grinding wheel lateral position, and the helical motion. Thus, even if the tooth profile errors (the pressure angle errors $\Delta fa_L$, $\Delta fa_R$, the tooth trace error ΔL, and the tooth thickness error Δth) occur in the tooth profile grinding of the workpiece W using the barrel-shaped threaded grinding wheel 17, correction is made using the axis correction items (the radial position error ΔX, the grinding wheel lateral position error ΔY, the grinding wheel turning angle error ΔΣ, and the helical motion error ΔP) appropriate for the tooth profile errors. Hence, the tooth profile errors can be surely corrected (reduced).

Moreover, according to the internal gear grinding machine 1 of the embodiment, first, the correction amount ΔPm for the helical motion is set that causes the tooth trace error ΔL to be reduced; next, the correction amount ΔYm for the grinding wheel lateral position is set that causes the pressure angle errors $\Delta fa_L$, $\Delta fa_R$ being asymmetric to be reduced; then, the correction amount ΔXm for the radial position error and the correction amount ΔΣ for the grinding wheel turning angle are set that cause the pressure angle errors $\Delta fa_L$, $\Delta fa_R$ being symmetric and the tooth thickness error Δth to be reduced; and the radial position, the grinding wheel lateral position, the grinding wheel turning angle, and the helical motion are corrected based on the correction amounts ΔXm, ΔYm, ΔΣm, ΔPm. Thus, the correction amounts (the correction amount ΔXm for the radial position error ΔX, the correction amount ΔYm for the grinding wheel lateral position error ΔY, the correction amount ΔΣm for the grinding wheel turning angle error ΔΣ, and the correction amount ΔPm for the helical motion error ΔP) corresponding to the tooth profile errors (the asymmetric pressure angle errors $\Delta fa_L$, $\Delta fa_R$, the symmetric pressure angle errors $\Delta fa_L$, $\Delta fa_R$, the tooth trace error ΔL, and the tooth thickness error nth) can be sequentially set to perform correction.

Further, according to the internal gear grinding machine 1 of the embodiment, analyses are made in advance for an influence of the radial position error ΔX, the grinding wheel lateral position error ΔY, the grinding wheel turning angle error ΔΣ, and the helical motion error ΔP on the pressure angle errors $\Delta fa_L$, $\Delta fa_R$, an influence of the helical motion error ΔP on the tooth trace error ΔL, and an influence of the radial position error ΔX, the grinding wheel turning angle error ΔΣ, and the helical motion error ΔP on the tooth thickness error Δth; based on results of the analyses, the correction amounts ΔXm, ΔYm, ΔΣm, ΔPm for the radial position, the grinding wheel lateral position, the helical motion, and the grinding wheel turning angle are set that cause the pressure angle errors $\Delta fa_L$, $\Delta fa_R$, the tooth trace error ΔL, and the tooth thickness error Δth to be reduced; and the radial position, the grinding wheel lateral position, the helical motion, and the grinding wheel turning angle are corrected based on the correction amounts ΔXm, ΔYm, ΔΣm, ΔPm. Thus, the correction amounts ΔXm, ΔYm, ΔΣm, ΔPm for the radial position, the grinding wheel lateral position, the grinding wheel turning angle, and the helical motion (the radial position error ΔX, the grinding wheel lateral position error ΔY, the grinding wheel turning angle error ΔΣ, and the helical motion error ΔP) are found in consideration of influences of the pressure angle errors $\Delta fa_L$, $\Delta fa_R$, the tooth trace error ΔL, and the tooth thickness error Δth of the workpiece W (internal gear) on each other. Hence, a highly accurate correction of the tooth profile errors of the internal gear can be performed in an early stage, thereby improving workability.

Furthermore, according to the internal gear grinding machine 1 of the embodiment, if the workpiece W (internal gear) is a spur gear, the correction amount ΔPm for the helical motion is set to zero. Thus, this configuration is suitable for a case where the workpiece (W) is a spur gear.

INDUSTRIAL APPLICABILITY

The present invention relates to an internal gear machining method and an internal gear machining apparatus for performing grinding (tooth profile grinding) of tooth surfaces of an internal gear with a barrel-shaped threaded grinding wheel, and is useful when applied to the case where highly accurate tooth profile grinding of the internal gear is to be achieved by correcting tooth profile errors occurring in the internal gear.

EXPLANATION OF THE REFERENCE NUMERALS

1 INTERNAL GEAR GRINDING MACHINE (INTERNAL GEAR MACHINING APPARATUS)
11 BED
12 COLUMN
13 SADDLE
14 TURNING HEAD
16 GRINDING WHEEL HEAD
16a GRINDING WHEEL ARBOR
17 THREADED GRINDING WHEEL
17a CONTACT (MESHING) LINE
18 ROTARY TABLE
19 MOUNTING JIG
21 DRESSING DEVICE
22 DISC DRESSER
23 BASE UNIT
24 TURNING UNIT
25 DRESSER ROTATION DRIVE MOTOR
31 NC DEVICE
32 OPERATION UNIT (PERSONAL COMPUTER)
33 CORRECTION AMOUNT CALCULATION UNIT
34 TOOTH THICKNESS CALCULATION UNIT

35 WORKPIECE ROTATION AXIS MOTION CORRECTION UNIT
36 GRINDING WHEEL POSITION CORRECTION UNIT
37 DISPLAY UNIT
40 GEAR ACCURACY MEASURING DEVICE
41 MEASURING ELEMENT
W WORKPIECE (INTERNAL GEAR)
Wa LEFT TOOTH SURFACE
Wb RIGHT TOOTH SURFACE

The invention claimed is:

1. An internal gear machining method in which an internal gear grinding machine performs grinding of a tooth surface of an internal gear using a barrel-shaped threaded grinding wheel having multiple teeth by synchronously rotating the internal gear and the barrel-shaped threaded grinding wheel in mesh with each other with a crossed-axes angle formed between the internal gear and the barrel-shaped threaded grinding wheel,
the method comprising:
  measuring, by a gear accuracy measuring device installed in the internal gear grinding machine, pressure angle errors in the tooth surface of the internal gear, a tooth trace error in the tooth surface of the internal gear, and a tooth thickness error in the tooth surface of the internal gear;
  reducing the measured pressure angle errors by correcting a radial position, a grinding wheel lateral position, a grinding wheel turning angle, and a helical motion;
  reducing the measured tooth trace error by correcting the helical motion; and
  reducing the measured tooth thickness error by correcting the radial position, the grinding wheel turn angle, and the helical motion.

2. The internal gear machining method according to claim 1, wherein first, a correction amount for the helical motion is set that causes the tooth trace error to be reduced,
next, a correction amount for a grinding wheel lateral position is set that causes the pressure angle errors being asymmetric to be reduced,
then, a correction amount for the radial position error and a correction amount for the grinding wheel turning angle are set that cause the pressure angle errors being symmetric and the tooth thickness error to be reduced, and
the radial position, the grinding wheel lateral position, the grinding wheel turning angle, and the helical motion are corrected based on the correction amounts.

3. The internal gear machining method according to claim 2, wherein
analyses are made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error,
based on results of the analyses, the correction amounts for the radial position, the grinding wheel lateral position, the helical motion, and the grinding wheel turning angle are set that cause the pressure angle errors, the tooth trace error, and the tooth thickness error to be reduced, and
the radial position, the grinding wheel lateral position, the helical motion, and the grinding wheel turning angle are corrected based on the correction amounts.

4. The internal gear machining method according to claim 2, wherein
the internal gear is a spur gear, and the correction amount for the helical motion is set to zero.

5. The internal gear machining method according to claim 1, wherein
analyses are made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error,
based on results of the analyses, the correction amounts for the radial position, the grinding wheel lateral position, the helical motion, and the grinding wheel turning angle are set that cause the pressure angle errors, the tooth trace error, and the tooth thickness error to be reduced, and
the radial position, the grinding wheel lateral position, the helical motion, and the grinding wheel turning angle are corrected based on the correction amounts.

6. The internal gear machining method according to claim 5, wherein
the internal gear is a spur gear, and the correction amount for the helical motion is set to zero.

7. The internal gear machining method according to claim 1, wherein
the internal gear is a spur gear, and the correction amount for the helical motion is set to zero.

8. An internal gear machining apparatus in which an internal gear grinding machine performs grinding of a tooth surface of an internal gear using a barrel-shaped threaded grinding wheel having multiple teeth by synchronously rotating the internal gear and the barrel-shaped threaded grinding wheel in mesh with each other with a crossed-axes angle formed between the internal gear and the barrel-shaped threaded grinding wheel, the internal gear machining apparatus comprising:
  a gear accuracy measurer installed in the internal gear grinding machine, and that measures pressure angle errors in the tooth surface of the internal gear, a tooth trace error in the tooth surface of the internal gear, and a tooth thickness error in the tooth surface of the internal gear; and
  a tooth profile error corrector that includes a processor and stores instructions that causes the processor to:
    reduce the measured pressure angle errors by correcting a radial position, a grinding wheel lateral position, a grinding wheel turning angle, and a helical motion;
    reduce the measured tooth trace error by correcting the helical motion; and
    reduce the measured tooth thickness error by correcting the radial position, the grinding wheel turning angle, and the helical motion.

9. The internal gear machining apparatus according to claim 8, wherein the tooth profile error corrector
first, sets a correction amount for the helical motion that causes the tooth trace error to be reduced;
next, sets a correction amount for a grinding wheel lateral position that causes the pressure angle errors being asymmetric to be reduced;
then, sets a correction amount for the radial position error and a correction amount for the grinding wheel turning angle that cause the pressure angle errors being symmetric and the tooth thickness error to be reduced; and corrects the radial position, the grinding wheel lateral position, the grinding wheel turning angle, and the helical motion on the basis of the correction amounts.

10. The internal gear machining apparatus according to claim 9, wherein the tooth profile error corrector sets the correction amounts for the radial position, the grinding wheel lateral position, the helical motion, and the grinding wheel turning angle that cause the pressure angle errors, the tooth trace error, and the tooth thickness error to be reduced, on the basis of analyses made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error, and the tooth profile error corrector corrects the radial position, the grinding wheel lateral position, the helical motion, and the grinding wheel turning angle on the basis of the correction amounts.

11. The internal gear machining apparatus according to claim 9, wherein
the internal gear is a spur gear, and the tooth profile error correction means sets the correction amount for the helical motion to zero.

12. The internal gear machining apparatus according to claim 8 wherein
the tooth profile error corrector sets the correction amounts for the radial position, the grinding wheel lateral position, the helical motion, and the grinding wheel turning angle that cause the pressure angle errors, the tooth trace error, and the tooth thickness error to be reduced, on the basis of analyses made in advance for an influence of a radial position error, a grinding wheel lateral position error, a grinding wheel turning angle error, and a helical motion error on the pressure angle errors, an influence of the helical motion error on the tooth trace error, and an influence of the radial position error, the grinding wheel turning angle error, and the helical motion error on the tooth thickness error, and the tooth profile error corrector corrects the radial position, the grinding wheel lateral position, the helical motion, and the grinding wheel turning angle on the basis of the correction amounts.

13. The internal gear machining apparatus according to claim 12, wherein
the internal gear is a spur gear, and the tooth profile error correction means sets the correction amount for the helical motion to zero.

14. The internal gear machining apparatus according to claim 8, wherein
the internal gear is a spur gear, and the tooth profile error corrector sets the correction amount for the helical motion to zero.

* * * * *